(12) United States Patent
Müller et al.

(10) Patent No.: US 7,389,640 B2
(45) Date of Patent: Jun. 24, 2008

(54) HYDRAULIC SYSTEM AND AUTOMATIC TRANSMISSION

(75) Inventors: Eric Müller, Kaiserslauten (DE); Reinhard Stehr, Bühl (DE); Manfred Homm, Bühl-Neusatz (DE); Michael Reuschel, Ottersweier (DE); Norbert Indlekofer, Bühl (DE); Ańdreas Englisch, Lauf (DE); Martin Vornehm, Bühl (DE); Christian Lauinger, Baden-Baden (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 73 days.

(21) Appl. No.: 10/510,140

(22) PCT Filed: Apr. 10, 2003

(86) PCT No.: PCT/DE03/01194

§ 371 (c)(1),
(2), (4) Date: May 23, 2005

(87) PCT Pub. No.: WO03/087627

PCT Pub. Date: Oct. 23, 2003

(65) Prior Publication Data

US 2005/0235637 A1    Oct. 27, 2005

(30) Foreign Application Priority Data

Apr. 10, 2002 (DE) .................. 102 15 715
Nov. 2, 2002 (DE) .................. 102 51 073
Dec. 10, 2002 (DE) .................. 102 57 575

(51) Int. Cl.
*F16D 31/02* (2006.01)
(52) U.S. Cl. ........................................ 60/430
(58) Field of Classification Search .............. 60/430
See application file for complete search history.

(56) References Cited

U.S. PATENT DOCUMENTS

| 3,926,075 | A | * | 12/1975 | Kronstadt | 60/405 |
| 4,712,375 | A | * | 12/1987 | Kauss et al. | 60/405 |
| 5,081,837 | A | * | 1/1992 | Ueno | 60/430 |
| 5,285,641 | A | * | 2/1994 | Goto et al. | 60/484 |
| 6,775,975 | B2 | * | 8/2004 | Hebisch et al. | 60/456 |

FOREIGN PATENT DOCUMENTS

| DE | 37 27 633 A | 3/1989 |
| DE | 43 31 266 A | 3/1995 |
| EP | 0 502 263 A1 | 9/1992 |
| EP | 0 764 799 A1 | 3/1997 |
| EP | 0 826 910 A1 | 3/1998 |
| WO | WO 01/53724 A1 | 7/2001 |

* cited by examiner

*Primary Examiner*—F. Daniel Lopez
(74) *Attorney, Agent, or Firm*—Alfred J. Mangels

(57) ABSTRACT

A hydraulic system including a multi-flow hydraulic pressure supply unit, especially a dual-flow hydraulic pressure supply unit, such as a pump, by which a volumetric flow of pressurized fluid is supplied to a hydraulic-fluid-operated device. A valve arrangement is provided either for switching between the individual pump flows or for interconnecting the individual pump flows.

10 Claims, 2 Drawing Sheets

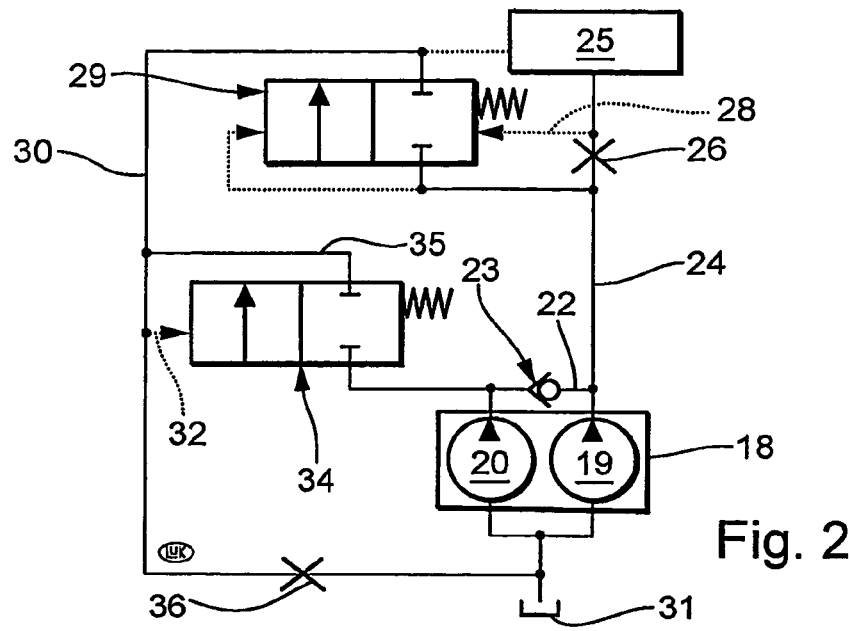
Fig. 2
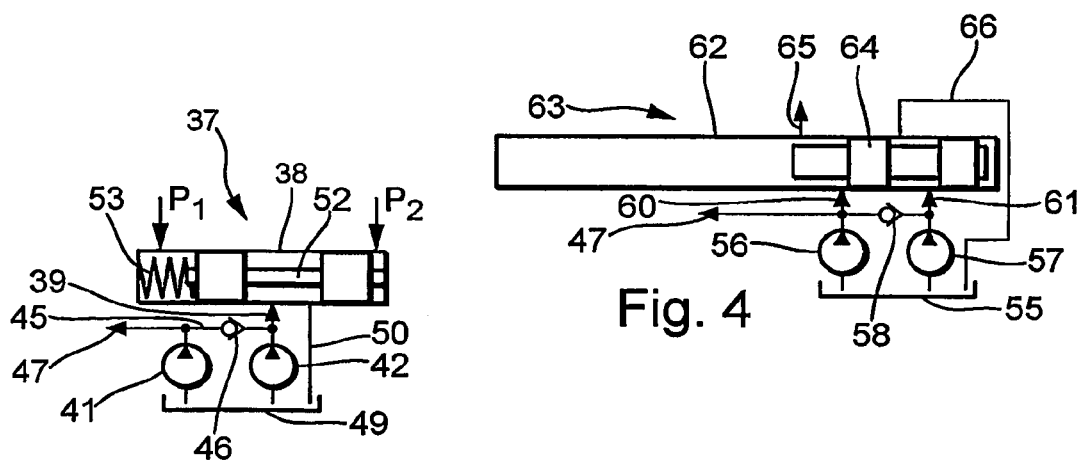
Fig. 3
Fig. 4
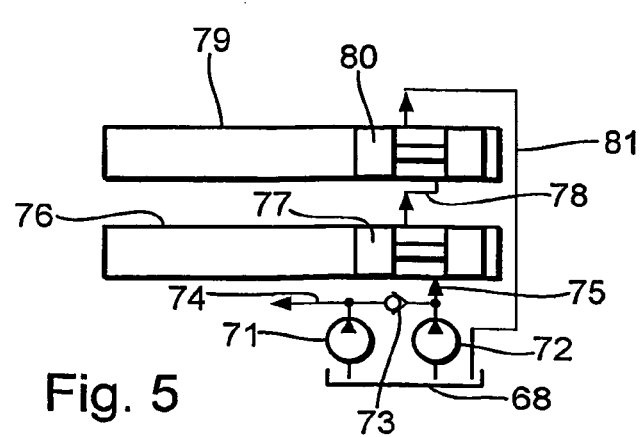
Fig. 5

HYDRAULIC SYSTEM AND AUTOMATIC TRANSMISSION

CROSS-REFERENCE TO RELATED APPLICATION

This application is a continuation of International Application Ser. No. PCT/DE03/01194, with an international filing date of Apr. 10, 2003, and designating the United States, the entire contents of which is hereby incorporated by reference to the same extent as if fully rewritten.

BACKGROUND OF THE INVENTION

1. Field of the Invention

The present invention relates to a hydraulic system with a multi-flow hydraulic pressure supply unit, especially a dual-flow hydraulic pressure supply unit, such as a pump, through which a volumetric flow of hydraulic fluid is fed to a hydraulic-fluid-operated device. The invention also relates to an automatic transmission for motor vehicles.

2. Description of the Related Art

In modern motor vehicles, hydraulic systems in which at least one pressure supply unit supplies at least one hydraulic-fluid-operated device with a defined pressure are being used to improve safety and comfort. The known hydraulic systems indeed have a high power density, a low power-weight ratio, and high dynamics, but they nonetheless require more energy in relation to regulated electric drives, which leads to higher fuel consumption. Previously, mostly single-flow pumps have been used to supply pressure to, for example, automatic transmissions. Single-flow here means that the pump conveys one pump flow. In contrast, multi-flow pumps convey several pump flows independently of one another. The pump flows are thus connected in parallel.

An object of the present invention is to reduce the losses in known hydraulic systems. The hydraulic pressure supply unit used in the hydraulic system should meet the demands of the automotive industry over a wide range of hydraulic requirements.

SUMMARY OF THE INVENTION

The object is achieved by a hydraulic system with a multi-flow hydraulic pressure supply unit, especially a dual-flow, hydraulic pressure supply unit, such as a pump, through which a volumetric flow is fed to a hydraulic-fluid-operated device. A valve for switching between the individual pump flows and/or for interconnecting the individual pump flows is provided. The valve enables actuating the individual pump flows selectively. It is possible to actuate only one or several pump flows with a single valve, as needed.

A preferred embodiment of the hydraulic system is characterized in that the individual pump flows are joined or separated through a check valve. The check valve makes it possible to conduct away at least one of the pump flows so that optionally only at least one of the pump flows is conveyed to the hydraulic-fluid-operated device.

A further preferred embodiment of the hydraulic system is characterized in that the at least one pump flow, which is separated by the check valve from the at least one other pump flow, can be conducted away through the valve. Only one pump flow or several pump flows are supplied to the hydraulic-fluid-operated device as a function of the setting of the valve. The check valve prevents all the pump flows from being conducted away.

A further preferred embodiment of the hydraulic system is characterized in that the valve includes an end surface that is biased by a spring, which surface is acted upon with the dynamic feedback pressure leading from the hydraulic-fluid-operated device to the input side of the hydraulic pressure supply unit. The use of the dynamic feedback pressure for actuating the valve assures that the valve switches from a single-flow to an at least dual-flow conveyance of the hydraulic pressure supply unit when the dynamic feedback pressure drops below a specified minimum value. If the dynamic feedback pressure exceeds a specified maximum value, the valve switches from an at least dual-flow to an at least single-flow delivery from the hydraulic pressure supply unit.

A further preferred embodiment of the hydraulic system is characterized in that a hydraulic resistance is arranged between the valve and the input side of the hydraulic pressure supply unit. The hydraulic resistance serves to generate the dynamic feedback pressure for actuating the valve.

A further preferred embodiment of the hydraulic system is characterized in that the valve includes a 2/2 way valve that releases a connection provided between the output side of a pump flow and the input side of the hydraulic pressure supply unit in the one position, the connection being interrupted in the other position of the 2/2 way valve. The 2/2 way valve makes it possible to feed the two pump flows to the hydraulic-fluid-operated device individually or together, depending upon need.

A further preferred embodiment of the hydraulic system is characterized in that the valve has three shifting stages, whereby in the first shifting stage a cooling circuit is not supplied and only one pump flow is conveyed to the hydraulic-fluid-operated device by the hydraulic pressure supply unit. In the second shifting stage the cooling circuit is not supplied and at least two pump flows are conveyed to the hydraulic-fluid-operated device from the hydraulic pressure supply unit. In the third shifting stage the cooling circuit is supplied and at least two pump flows are conveyed to the hydraulic-fluid-operated device from the hydraulic pressure supply unit. The shifting stages make it possible to use the valve, which can be actuated as needed, for also turning the cooling system on and off, for example of a clutch.

A further preferred embodiment of the hydraulic system is characterized in that the valve has a further shifting stage in which the cooling circuit is not supplied and a safety valve is operated. The safety valve can serve, for example, to prevent overheating of the medium conveyed, or can represent a redundant opening mechanism for a clutch.

A further preferred embodiment of the hydraulic system is characterized in that the valve, especially as a 2/2 way valve, is designed such that only one pump flow is conveyed from the hydraulic pressure supply unit to the hydraulic-fluid-operated device as long as a first pressure, especially the adjustment pressure of an automatic transmission, is smaller than or equal to the sum of a second pressure, especially the contact pressure of an automatic transmission, and of a spring force, and in that at least two pump flows are conveyed from the hydraulic pressure supply unit to the hydraulic-fluid-operated device if the first pressure, especially the adjustment pressure of an automatic transmission, is greater than the sum of the second pressure, especially the contact pressure of an automatic transmission, and of the spring force. In that way, it is assured that connection of at least one further pump flow will take place as a function of need.

A further preferred embodiment of the hydraulic system is characterized in that the valve includes a spool whose one end face is acted upon by the first pressure and whose other end face is acted upon by the second pressure and the spring force.

The spool moves as a function of the forces acting upon it and thus releases a flow path for one or more pump flows.

A further preferred embodiment of the hydraulic system is characterized in that the valve performs even additional valve functions in addition to turning on or shutting off the pump flow (the first valve function) in that the valve spool releases or closes openings on other control units. Those additional valve functions can, for example, be an application of pressure on a hydraulic clutch, or the application of pressure on the conical pulleys of a continuously variable transmission. The coupling of the first valve function with a further valve function represents a cost advantage because, instead of two slides and two boreholes, only one need be manufactured or machined.

The coupling of the first valve function with a further valve function likewise represents a functional advantage if a volumetric flow requirement is controlled through the further valve function whose coverage takes place in the same valve by turning on a pump flow. The coupling of the first valve function with a further valve function likewise represents a functional advantage when those valve functions can take place in connection with different motions of the spool, that is, in part independently. For example, the additional valve function can represent the application of pressure on a clutch for the second gear, and the spool now permits connecting an additional pump flow by a further motion of the spool when the clutch is not actuated. That control and especially further displacement of the spool takes place in a known manner, for example by applying a small electronically controlled pressure to an end face of the spool.

A further preferred embodiment of the hydraulic system is characterized in that the valve includes at least two valves whose switching respectively brings about the conveyance of at least one of the pump flows to the hydraulic-fluid-operated device. Both valves in each case assume even further functions, as described above, for example respectively subjecting a clutch to pressure.

A further preferred embodiment of the hydraulic system is characterized in that the two valves are connected in series. Switching from one of the two valves leads to at least one of the pump flows being conveyed to the hydraulic-fluid-operated device. The at least one pump flow is conveyed back to the input side of the hydraulic pressure supply unit.

A further preferred embodiment of the hydraulic system is characterized in that a volumetric flow regulating valve is arranged between the output side of the pressure supply unit and the hydraulic-fluid-operated device. The volumetric flow regulating valve serves to regulate the volumetric flow to the hydraulic-fluid-operated device. The excess volumetric flow is conveyed back to the input side of the hydraulic pressure supply unit.

A further preferred embodiment of the hydraulic system is characterized in that connection/disconnection of individual pump flows takes place as needed. For example, fixed rotational speed thresholds can be defined, at which the switching takes place. Here care should be taken that the requisite need is still being covered when disconnecting a pump flow.

A further preferred embodiment of the hydraulic system is characterized in that the ratio between the individual pump flows is asymmetrical. Thereby it is possible to convey three different volumetric flows with one hydraulic pressure supply unit.

A further preferred embodiment of the hydraulic system is characterized in that a first pump flow covers approximately a third and a second pump flow approximately two thirds of the overall conveyed flow of the hydraulic pressure supply unit. With a corresponding control logic, both pump flows together can supply 100% or only one pump flow can supply 33% or 66% of the entire conveyed flow of the hydraulic supply unit, as needed.

A further preferred embodiment of the hydraulic system is characterized in that the hydraulic pressure supply unit includes a vane pump or an internal gear pump.

A further preferred embodiment of the hydraulic system is characterized in that a hydraulic resistance is arranged between the valve and the input of the hydraulic pressure supply unit. An injector pump is incorporated in the vane pump. The injector pump is used to assure proper filling of the preferably mechanically driven pump at higher rotational speeds.

The above-identified object is achieved in connection with an automatic transmission for motor vehicles through a previously described hydraulic system. The hydraulic system in accordance with the invention can also, however, be used in the steering system or the anti-roll system.

BRIEF DESCRIPTION OF THE DRAWINGS

Further advantages, features and details of the invention become apparent through the description below, in which various embodiments are described in detail with reference to the drawings. There is shown:

FIG. 2 a block diagram of an arrangement for controlling a dual-flow pump with a valve and an additional flow regulating valve;

FIG. 3 a block diagram of an arrangement for controlling a dual-flow pump with switching dependent upon two different pressures;

FIG. 4 a block diagram of an arrangement for controlling a dual-flow pump with a volumetric flow; and FIG. 5 a block diagram of an arrangement for controlling a dual-flow pump with two valves connected in series.

DESCRIPTION OF THE PREFERRED EMBODIMENTS

Figure 1:
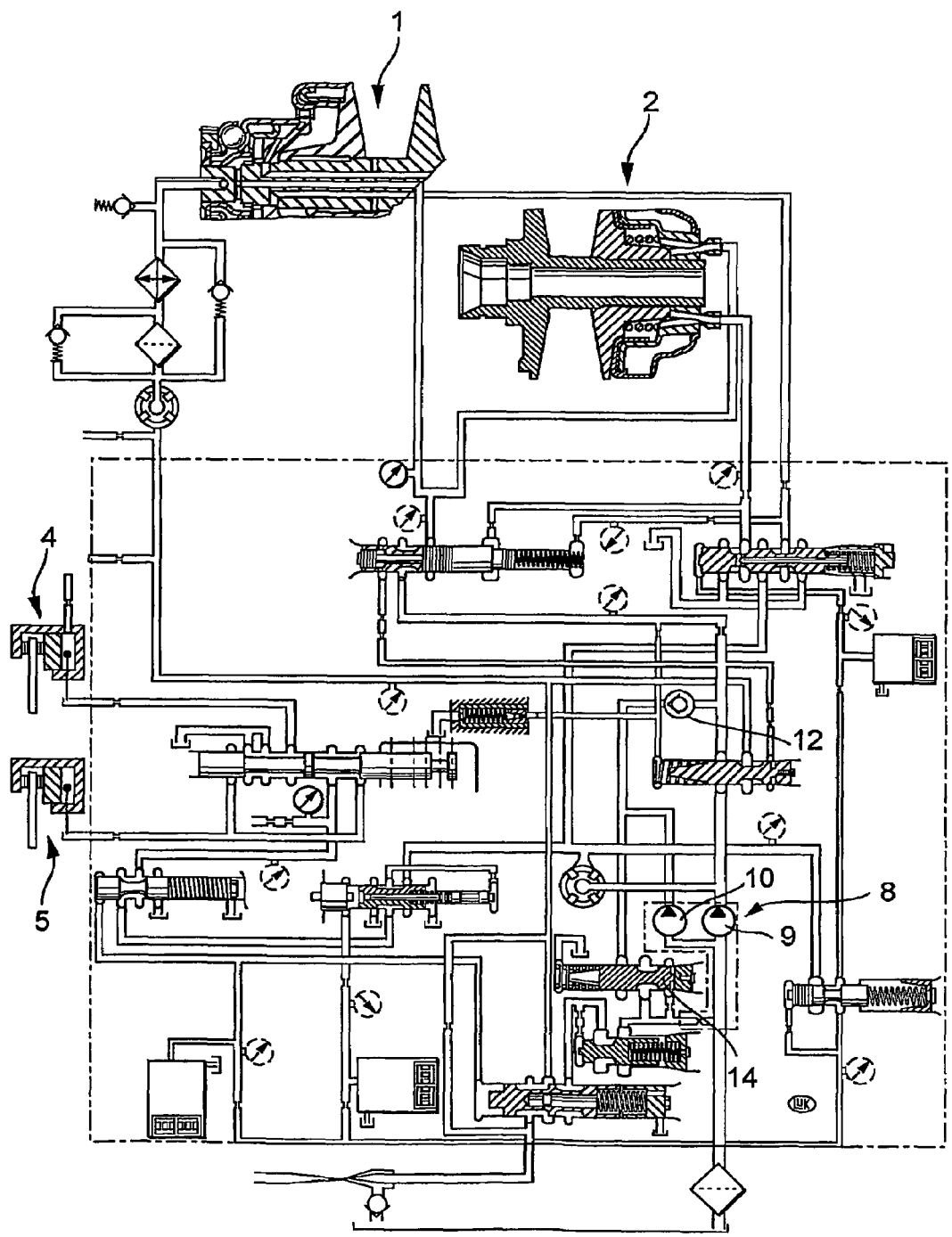
FIG. 1 a hydraulic circuit diagram of a hydraulic system in accordance with an embodiment of the invention for controlling an automatic transmission.

Contemporary automatic transmissions for passenger cars control the starting process, the transmission ratio change, and the operation of the reversing clutch for forward/reverse travel, as well as for cooling and lubricating hydraulically. A hydraulic pressure supply unit and a hydraulic control unit are necessary for those purposes.

Up until now, largely single-flow pumps have been used for supplying pressure to automatic transmissions. The pumps are distinguished in that their conveyed volumes are directly proportional to their rotational speed. That is disadvantageous insofar as, in designing pump sizes, often extreme situations such as, for example, a rapid adjustment at low rotational speeds, are design specific. In many other driving situations, the volumetric flow then made available is not necessary. The efficiency of those pumps is not optimal since, for example, unnecessarily high hydraulic power is generated by the mechanically driven pump at maximum speed. Second, the hydraulic components used, such as, for example, the pump, are subjected to unnecessarily high stress at maximum pump speed.

A pump concept is provided by the present invention, in which the required volumetric flow is generated as a function of demand. In that way, the dissipated hydraulic power, as well as the stress on the pump, can be reduced. With the hydraulic system in accordance with the present invention, it proves to be advantageous that the system pressure can be reduced, since at a high system pressure leakages as a rule increase. The control of the individual pump flows is preferably carried out in such a way that the net volumetric flow remains unchanged. Generating less volumetric flow at the same rotational speed with cold oil than with warm oil is desirable, since at low oil temperatures less leakage is present and consequently the volumetric flow requirement drops.

It has proven to be advantageous if a portion of the volumetric flow made available by the pump is also used for cooling the transmission. With cold outside temperatures, it is advantageous to reduce the volumetric flow to the point that only the precisely required amount flows through the radiator, and consequently heat losses are reduced. With a very hot transmission, it is advantageous to generate more volumetric flow than needed in order to increase heat transfer.

It has likewise proven to be advantageous if a portion of the volumetric flow furnished by the pump is also used for cooling individual components of the transmission in danger of overheating, for example friction clutches. At low friction load it is advantageous to shut the volumetric flow off, while at high friction load (starting on a mountain), the required amount of cold oil is directed over the friction clutch to protect the latter from overheating.

A hydraulic control unit for an automatic transmission with an input disk set 1 and an output disk set 2 is shown in FIG. 1. The hydraulic system shown in FIG. 1 also serves to control a clutch 4 for reverse travel and a clutch 5 for forward travel. Actuation of the disk sets 1, 2 and the clutches 4, 5 takes place through a pump 8 in which a first pump flow 9 and a second pump flow 10 are generated parallel to each other. The two pump flows 9 and 10 are brought together through a check valve 12. An additional valve 14 serves to switch between the two pump flows 9, 10, such that either only pump flow 9 or both the pump flows 9, 10 are conveyed together in the direction of hydraulic-fluid-operated devices 1, 2, 4, and 5.

A preferred embodiment for selective control of two pump flows is shown in FIG. 2. One pump 18, a vane pump, for example, is constructed and designed such that a first pump flow 19 is conveyed parallel to a second pump flow 20. The two pump flows 19 and 20 are connected with each other on the output side of the pump 18 through a conduit 22 in which a check valve 23 is arranged. The check valve 23 is arranged in the conduit 22 such that either only the first pump flow 19 or the first pump flow 19 as well as the second pump flow 20 are conveyed through a conduit 24 to a hydraulic-fluid-operated device 25. An orifice plate 26 is arranged in the conduit 24 between the output side of the pump 18 and the hydraulic-fluid-operated device 25. The orifice plate 26, as is indicated through a dotted arrow 28, is part of a flow regulating valve 29, which is arranged between the input side and the output side of the hydraulic-fluid-operated device 25 in order to regulate the volumetric flow that is supplied to the hydraulic-fluid-operated device 25. A 2/2 way proportional way valve is installed as the flow regulating valve 29. If the volumetric flow conveyed to the hydraulic-fluid-operated device 25 exceeds an adjustable maximum value, then the flow-regulating valve switches into its second position from the position shown in FIG. 2. In its second position (not shown), the flow-regulating valve 29 releases a connection from the output side of the pump 18 through the conduit 24 past the hydraulic-fluid-operated device to a return conduit 30 that leads to a tank 31.

An arrow 32 indicates that the pressure in the return conduit 30 serves to control an additional valve 34. The valve 34 is a 2/2 way proportional valve that interrupts or releases (not shown) a connecting conduit 35 between the return conduit 30 and the output side of the second pump flow 20 of the pump 18. The pressure in the return conduit 30 is restricted upstream of the valve 34 by a hydraulic resistance 36.

With the hydraulic system shown in FIG. 2, the valve 34 is used to convey selectively either only pump flow 19 or the two pump flows 19 and 20 together to the hydraulic-fluid-operated device 25. The back pressure in the conduit 30 is used, as indicated by the arrow 32, to shift the valve 34 against a spring. The hydraulic fluid volumetric flow flowing back over the return conduit 30 into the tank 31, and/or toward the input side of the pump 18, meets the hydraulic resistance 36, which generates the back pressure as a function of the volumetric flow. The injector pump used in vane pumps can be used as a hydraulic resistance 36, for example. Such an injector pump is needed in vane pumps to assure proper filling of the pump at higher rotational speeds. The hydraulic resistance 36 is shown as an orifice plate in FIG. 2.

The dual-flow pump 18 is driven by a crankshaft of an internal combustion engine, for example, and consequently conveys a hydraulic fluid volumetric stream as a function of pump rotational speed. The two pump flows 19 and 20 are brought together by the check valve 23 and are supplied to the hydraulic-fluid-operated device 25 through the conduit 24 and the orifice plate 26 when the control valve 34 is in the position shown in FIG. 2. As for the hydraulic-fluid-operated device, it can be, as shown in FIG. 1, a disk set for adjusting the transmission ratio condition or a clutch in an automatic transmission. Hydraulic fluid flowing back from the hydraulic-fluid-operated device 25 through the return conduit 30 is supplied to the pump 18 again through the hydraulic resistance 36.

If the rotational speed of the pump 18 is increased, then more hydraulic fluid is needed and is fed to the hydraulic-fluid-operated device 25. The return flow of hydraulic fluid through the return conduit 30 to the suction section of the pump 18 is correspondingly higher. The back pressure increase at the hydraulic resistance 36 owing to that leads to the valve apparatus 34 shortcircuiting the second pump flow 20 of the pump 18 with the return flow of hydraulic fluid in the return conduit 30. In that way, the pressure of the second pump flow 20 decreases to the back pressure in the return conduit 30 and the check valve 23 closes. The second pump flow 20 of the pump 18 is then switched to recycling and needs only to convey against the back pressure in the return conduit 30, which would be present in any case. In that way, the power required by the pump 18 is reduced.

If the rotational speed of the pump 18 increases, and therewith of the volumetric flow fed to the hydraulic-fluid-operated device 25, then the volumetric flow regulating valve 29 connected with the orifice plate 26 restricts the volumetric flow to the hydraulic-fluid-operated device 25. The hydraulic system shown in FIG. 2 affords the advantage that the second pump flow 20 is only added when needed. If the hydraulic-fluid-operated device 25 needs more hydraulic fluid, and consequently no or little hydraulic fluid is being passed back through the flow regulating valve 29 and the return conduit 30 to the tank 31 or toward the input side of the pump 18, then the volumetric flow decreases due to the hydraulic resistance 36, and therewith the back pressure in the return conduit 30. That causes the valve 34 to close, and the hydraulic fluid volumetric flow of the second pump flow 20 to be conducted back to the hydraulic-fluid-operated device 25, as shown in FIG. 2. That ensures the increased need for hydraulic fluid. If the need of the hydraulic-fluid-operated device 25 decreases again, then correspondingly more hydraulic oil is fed back, which leads to a renewed switching of the second pump flow 20 to pressureless recycling.

A portion of a hydraulic block diagram is shown in FIG. 3 in which a valve for need-dependent volumetric flow generation is designed by 37. The valve 37 includes a valve housing 38 that is connected with the output side of a pump having two pump flows 41 and 42, through a conduit 39. The two pump flows 41 and 42 are connected with each other through a conduit 45 in which a check valve 46 is arranged. The fact that the output side of the pump flows 41 and 42 is connected with a hydraulic-fluid-operated device (not shown) is indicated by an arrow 47. The input side of the pump flows 41 and 42 is connected with a hydraulic tank 49. A conduit 50 leads from the hydraulic tank 49 to the valve housing 38. A spool 52 is biased by a spring 53 in the valve housing 38. The end face of the spool 52 facing away from the spring 53 is acted upon by a pressure $P_1$. The end face of the spool 52 facing away from the spring 53 is acted upon by a pressure $P_2$.

In the condition of the valve 37 shown in FIG. 3, the pump flow 42 is recirculated through the conduit 50 and does not reach the hydraulic-fluid-operated device. Only the pump flow 41 reaches the hydraulic-fluid-operated device through conduit 47. It is assured by the check valve 46 that pump flow 41 does not reach the valve housing 38 through conduit 39. When the spool 52 moves such that the conduit 39 is closed, the pressure at the output of the pump flow 42 rises until the check valve 46 in the conduit 45 opens the connection to the pump flow 41. Then both pump flows 41 and 42 are conveyed to the hydraulic-fluid-operated device. Connection of the pump flow 42 to pump flow 41 takes place when the product of a first constant and adjusting pressure $P_2$ is greater than the product of a second constant and the sum of the contact pressure $P_1$ and the force of the spring. The pressures $P_1$ and/or $P_2$ can alternatively be a pressure that controls a function requiring volumetric flow already present in the hydraulic control unit, or a pressure produced by an electric control apparatus controlled by a pilot valve.

The circuit diagram of a hydraulic system is shown in FIG. 4 in which a first pump flow 56 as well as a second pump flow 57 of a vane pump are fed from a tank 55. The two pump flows 56 and 57 are connected with each other through a check valve 58. The output of the first pump flow 56 is connected with a valve housing 62 of a valve 63 through a conduit 60. The second pump flow 57 is connected with the valve housing 62 through a conduit 61. A spool 64 is moveably received in the valve housing 62 of the valve 63. The spool can carry out even further functions in the left region (not shown), in that oil channels can be closed or opened according to the position of the spool. A connection to a hydraulic-fluid-operated device (not shown) is indicated by an arrow 65 that proceeds from the valve housing 62. Moreover a return conduit 66 proceeds from the valve housing 62 and opens into the tank 55.

In the position of the spool 64 as shown in FIG. 4, the first pump flow 56 is conveyed over the conduits 60 and 65 to the hydraulic-fluid-operated device. The second pump flow 57 is conveyed back into the tank 55 through conduit 61 and the return conduit 66. When the spool 64 is moved to the right, the connection between the conduit 61 and the return conduit 66 is interrupted, which leads to the pressure rising on the output side of the second pump flow 57 until the check valve 58 opens and the two pump flows 56 and 57 are conveyed together over conduits 60 and 65 to the hydraulic-fluid-operated device.

A circuit diagram of a hydraulic system is shown in FIG. 5 in which a first pump flow 71 as well as a second pump flow 72 are fed with hydraulic fluid from a tank 68. The two pump flows 71 and 72 are connected with each other through a check valve 73. A conduit to hydraulic-fluid-operated devices (not shown) is indicated by an arrow 74. A connection between the output side of the second pump flow 72 to a valve housing 76 of a first valve is indicated by an arrow 75. A spool 77 is moveably received in the valve housing 76. The valve housing 76 of the first valve is connected with a valve housing 79 of the second valve through a conduit 78. A spool 80 is moveably received in the valve housing 79 of the second valve. The valve housing 79 of the second valve is connected with the tank 68 through a return conduit 81.

In the left region not shown, each of the valves can carry out even further functions with the same spool in that oil channels are closed or opened. For example, clutches can be pressurized, or particular hydraulic-fluid-operated devices requiring volumetric flow, such as a cooling system, can be switched on.

The second pump flow 72 is conveyed through the conduits 75, 78, and 81 back into the tank 68, thus recirculated, in the positions of the spools 77 and 80 in the associated valve housings 76 and 79 as shown in FIG. 5. The connection between the two pump flows 71 and 72 is interrupted by the check valve 73. If one of the spools 77 and 80 is moved to the right against the associated stop, then the return flow into the tank 68 is interrupted. That leads to a rise in pressure on the output side of the second pump flow 72. The pressure on the output side of the second pump flow 72 rises until the check valve 73 opens, and both pump flows 71 and 72 are jointly conveyed through the conduit 74 to the hydraulic-fluid-operated device. The two valves with valve housings 76 and 79 are thus switched in a row or in series.

The claims submitted with the application are formulation proposals without prejudice to obtaining further-reaching patent protection. The applicant reserves the right to claim additional feature combinations previously disclosed only in the description or the drawings.

References in the dependent claims refer back to the further development of the object of the main claim by the features of the respective dependent claim. They are not to be understood as a waiver of attaining an independent, objective protection for the feature combinations of the referred back dependent claims.

Since the objects of the dependent claims can form their own and independent inventions with respect to the state of the art on the priority day, the applicant reserves the right to make them the object of the independent claims or divisional applications. They can furthermore also contain independent inventions that have an independent configuration from the objects of the preceding dependent claims.

The embodiments are not to be understood as a restriction of the invention. Rather, numerous changes and modifications are possible in the framework of the present invention, especially such variants, elements, and combinations and/or materials, that can be inferred, for example, by combination or modification of individual features in combination with the general description and embodiments, as well as features described in the claims and contained in the drawings, or elements and procedural steps which can be inferred by the specialist with respect to accomplishing the objective and that lead by combinable features to a new object, or to new procedural steps, or to new procedural step sequences, also to the extent that they concern manufacturing, testing, and operating procedures.

What is claimed is:

1. A hydraulic system with a dual-flow hydraulic pressure supply unit from which a volumetric flow of hydraulic fluid is fed, said hydraulic system comprising: a unitary hydraulic pressure supply unit for providing from a first fluid outlet a first hydraulic fluid output flow and from a second fluid outlet a second hydraulic fluid output flow; a hydraulic-fluid-operated device operatively connected with the pressure supply unit for receiving hydraulic fluid from the pressure supply unit, wherein the hydraulic-fluid-operated device is a continuously variable transmission; a check valve positioned between and connected with each of the first and second fluid outlets for selectively allowing and blocking flow from one of the fluid outlets to the hydraulic-fluid-operated device; and a flow regulator for selectively switching between the first hydraulic fluid outlet flow and the combined first and second hydraulic fluid output flows with the hydraulic-fluid-operated device, wherein at least one fluid outlet flow is separated by the check valve from the other fluid outlet flow, and wherein the system includes a return conduit for conducting at least one fluid outlet flow away from the hydraulic-fluid-operated device through the flow regulator, and wherein the flow regulator includes a first valve having a first surface biased by a spring and a second surface that is acted upon by a back pressure in the return conduit.

2. A hydraulic system according to claim 1, including a hydraulic resistance arranged between the first valve and an input side of the hydraulic pressure supply unit.

3. A hydraulic system according to claim 1, wherein the flow regulator includes a 2/2 way valve that in one position provides a connection between the output side of the hydraulic pressure supply unit and the input side of the hydraulic pressure supply unit, and wherein the connection is interrupted in a second position of the 2/2 way valve.

4. A hydraulic system according to claim 1, wherein a volumetric flow regulating valve is arranged between the output side of the hydraulic pressure supply unit and the hydraulic-fluid-operated device to regulate volumetric flow of the hydraulic fluid.

5. A hydraulic system according to claim 1, wherein total flow from the hydraulic pressure supply unit is dependent upon hydraulic fluid volumetric need.

6. A hydraulic system according to claim 1, wherein the first and second hydraulic fluid output flows have different volumetric flow values.

7. A hydraulic system according to claim 6, wherein the first fluid output flow is approximately a third of total hydraulic fluid output flow and the second fluid outlet flow is approximately two thirds of total hydraulic fluid output flow of the hydraulic pressure supply unit.

8. A hydraulic system according to claim 1, wherein the hydraulic pressure supply unit is a vane pump.

9. A hydraulic system according to claim 8, including a hydraulic resistance positioned between the flow regulator and an input side of the hydraulic pressure supply unit.

10. A hydraulic system according to claim 1, wherein the hydraulic pressure supply unit is an internal gear pump.

* * * * *